US009870393B2

(12) United States Patent
Chen

(10) Patent No.: US 9,870,393 B2
(45) Date of Patent: Jan. 16, 2018

(54) GRAPH PROCESSING IN DATABASE

(71) Applicant: Microsoft Technology Licensing, LLC, Redmond, WA (US)

(72) Inventor: Liang Chen, Beijing (CN)

(73) Assignee: Microsoft Technology Licensing, LLC, Redmond, WA (US)

(*) Notice: Subject to any disclaimer, the term of this patent is extended or adjusted under 35 U.S.C. 154(b) by 339 days.

(21) Appl. No.: 14/611,967

(22) Filed: Feb. 2, 2015

(65) Prior Publication Data

US 2016/0179883 A1    Jun. 23, 2016

(30) Foreign Application Priority Data

Dec. 19, 2014  (WO) ................ PCT/CN2014/094401

(51) Int. Cl.
*G06F 17/30*   (2006.01)

(52) U.S. Cl.
CPC .. *G06F 17/30439* (2013.01); *G06F 17/30292* (2013.01); *G06F 17/30339* (2013.01); *G06F 17/30466* (2013.01); *G06F 17/30469* (2013.01); *G06F 17/30498* (2013.01); *G06F 17/30958* (2013.01)

(58) Field of Classification Search
CPC ......... G06F 17/30498; G06F 17/30427; G06F 17/30469; G06F 17/30958; G06F 17/30292
USPC .......................... 707/763, 713, 798, 714, 741
See application file for complete search history.

(56) References Cited

U.S. PATENT DOCUMENTS

| | | |
|---|---|---|
| 6,105,035 A | 8/2000 | Monge et al. |
| 7,016,910 B2 | 3/2006 | Egilsson et al. |
| 7,043,487 B2 | 5/2006 | Krishnamurthy et al. |
| 7,454,428 B2 | 11/2008 | Wang et al. |
| 7,580,918 B2 | 8/2009 | Chang et al. |
| 7,630,967 B1 | 12/2009 | Srivastava et al. |
| 7,668,665 B2 | 2/2010 | Kim |
| 7,701,877 B1 | 4/2010 | Rozenman et al. |
| 7,979,449 B2 | 7/2011 | Holster |
| 8,152,134 B2 * | 4/2012 | Stenberg ................. F16K 1/465 137/557 |

(Continued)

FOREIGN PATENT DOCUMENTS

| | | |
|---|---|---|
| CN | 101359337 A | 2/2009 |
| JP | 2011028454 A | 2/2011 |

OTHER PUBLICATIONS

"International Search Report and Written Opinion for PCT Patent Application No. PCT/CN2014/094401", dated Sep. 29, 2015, Filed Date: Dec. 19, 2014, 5 Pages.

(Continued)

*Primary Examiner* — Jean M Corrielus

(57) ABSTRACT

The subject matter described herein relates to database middleware for enabling graph processing. A middleware between the graph data and underlying relational or SQL database is proposed. The local properties and topology information of nodes in the graph can be stored in a single node table in the database, thereby eliminating the need for a physical junction table. The middleware may efficiently translate graph queries into SQL queries over related tables. In some examples, the middleware may optimize the translated queries using the topology knowledge which is oblivious to the database query engine.

19 Claims, 5 Drawing Sheets

(56) References Cited

U.S. PATENT DOCUMENTS

| | | | |
|---|---|---|---|
| 8,332,420 | B2 | 12/2012 | Kaiser |
| 8,639,847 | B2 | 1/2014 | Blaszczak et al. |
| 8,719,252 | B2 | 5/2014 | Miranker et al. |
| 9,400,815 | B2* | 7/2016 | Poppitz .............. G06F 17/30498 |
| 2005/0125388 | A1 | 6/2005 | Karve et al. |
| 2009/0132503 | A1* | 5/2009 | Sun ................... G06F 17/30427 |
| 2011/0167402 | A1 | 7/2011 | Ahmad |
| 2012/0102022 | A1* | 4/2012 | Miranker .......... G06F 17/30427 707/713 |
| 2014/0012882 | A1* | 1/2014 | Poppitz ............. G06F 17/30498 707/792 |
| 2015/0052134 | A1* | 2/2015 | Bornea ............. G06F 17/30598 707/737 |
| 2016/0179883 | A1* | 6/2016 | Chen ................. G06F 17/30292 707/714 |
| 2016/0203206 | A1* | 7/2016 | Bornea ............. G06F 17/30598 707/737 |
| 2017/0147705 | A1* | 5/2017 | Kasperovics ..... G06F 17/30958 |

OTHER PUBLICATIONS

Kaplan, et al., "Implementing Graph Pattern Queries on a Relational Database", In Technical Report, Jan. 8, 2008, 27 pages.

"Apache Hive Tm", Sep. 22, 2014, Available at: http://hive.apache.org/.

"Cloudera Impala", Sep. 22, 2014, Available at: http://www.cloudera.com/content/cloudera/en/products-and-services/cdh/impala.html.

"The Database for Speed, Scale & Simplicity", Sep. 22, 2014, Available at: http://www.memsql.com/.

"Teradata", Sep. 22, 2014, Available at: http://in.teradata.com/?LangType=16393&LangSelect=true.

Acharya, et al., "Relational Support for Flexible Schema Scenarios", In Proceedings of the VLDB Endowment, vol. 1, Issue 2, Aug. 23, 2008, pp. 1289-1300.

Bernstein, et al., "Adapting Microsoft SQL Server for Cloud Computing", In IEEE 27th International Conference on Data Engineering, Apr. 11, 2011, pp. 1255-1263.

Bu, et al., "HaLoop: Efficient Iterative Data Processing on Large Clusters", In Proceedings of the VLDB Endowment, vol. 3, Issue 1-2, Sep. 2010, pp. 285-296.

Chaiken, et al., "Scope: Easy and Efficient Parallel Processing of Massive Data Sets", In Proceedings of the VLDB Endowment, vol. 1, Issue 2, Aug. 23, 2008, pp. 1265-1276.

Grust, et al., "XQuery on SQL Hosts", In Proceedings of 30th International Conference on Very Large Data Bases, Aug. 31, 2004, pp. 252-263.

Kamwar. et al., "Adaptive Methods for the Computation of PageRank", In Proceedings of Linear Algebra and its Applications, vol. 386, Jul. 15, 2004, 15 pages.

Kamwar. et al., "Extrapolation Methods for Accelerating PageRank Computations", In Proceedings of the 12th International Conference on World Wide Web, May 20, 2003, pp. 261-270.

Kang, et al., "Pegasus: A Peta-Scale Graph Mining System Implementation and Observations", In Proceedings of 9th IEEE International Conference on Data Mining, Dec. 6, 2009, 10 pages.

Loo, et al., "Declarative Networking: Language, Execution and Optimization", In Proceedings of ACM SIGMOD International Conference on Management of Data, Jun. 27, 2006, pp. 97-108.

Low, et al., "GraphLab: A New Framework for Parallel Machine Learning", In Proceedings of 26th Conference on Uncertainty in Artificial Intelligence, Jul. 8, 2010, 10 pages.

Low, et al., "Distributed GraphLab: A Framework for Machine Learning and Data Mining in the Cloud", In Proceedings of the VLDB Endowment, vol. 5, No. 8, Aug. 27, 2012, pp. 716-727.

Malewicz, et al., "Pregel: A System for Large-Scale Graph Processing", In Proceedings of ACM SIGMOD International Conference on Management of Data, Jun. 6, 2010, pp. 135-145.

McSherry, et al., "Differential Dataflow", In Proceedings of 6th Biennial Conference on Innovative Data Systems Research, Jan. 6, 2013, 12 pages.

Shute, et al., "F1: A Distributed SQL Database that Scales", In Proceedings of the VLDB Endowment, vol. 6, Issue 11, Aug. 26, 2013, pp. 1068-1079.

Stonebraker, et al., "The VoltDB Main Memory DMBS", In Proceedings of Bulletin of the IEEE Computer Society Technical Committee on Data Engineering, Jun. 2013, pp. 21-27.

Sun, et al., "Efficient Subgraph Matching on Billion Node Graphs", In Proceedings of the VLDB Endowment, vol. 5, Issue 9, Aug. 27, 2012, pp. 788-799.

Wang, et al., "Asynchronous Large-Scale Graph Processing Made Easy", In Proceedings of 6th Biennial Conference on Innovative Data Systems Research, Jan. 6, 2013, 12 pages.

"Oracle Spatial and Graph", Sep. 22, 2014, Available at: http://www.oracle.com/us/products/database/options/spatial/overview/index.html.

"Resource Description Framework Application Development in DB2 10 for Linux, UNIX, and Windows, Part 1: RDF Store Creation and Maintenance", Sep. 22, 2014, Available at: http://www.ibm.com/developerworks/data/tutorials/dm-1205rdfdb210/.

"Supplementary Search Report Issued in European Patent Application No. 14908251.3", dated Aug. 30, 2017, 4 pages.

"Office Action dated European Patent Application No. 14908251.3", dated Oct. 23, 2017, 6 pages.

* cited by examiner

GRAPH PROCESSING IN DATABASE

RELATED APPLICATIONS

This application claims priority to International Application No. PCT/CN2014/094401, filed on Dec. 19, 2014, and entitled "GRAPH PROCESSING IN DATABASE." This application claims the benefit of the above-identified application, and the disclosure of the above-identified application is hereby incorporated by reference in its entirety as if set forth herein in full.

BACKGROUND

Graph data is becoming ubiquitous. As known, a graph may have two or more nodes (or entities), each of which has one or more local properties. In addition, a node in a graph may have associations or relationships with one or more other nodes in the graph. The association between two nodes may be referred to as an "edge." The edge can be directed or undirected. For two nodes connected by an edge, one node is referred to as an "adjacent node" or a "neighbor node" of the other.

In a variety of applications, it is necessary to store and query such graph data in databases. Many conventional databases such as relational databases have been successful in tabulating data. However, these conventional databases have difficulties in processing graphs since the nature of graph data is quite different from that of tabular data. For example, a graph traversal is a common and fundamental operation in graph processing. Given a source node, the graph traversal returns data of one or more nodes adjacent to the source node. In the relational databases, data is usually normalized to avoid redundancy and update anomalies. Nodes in a graph, however, are highly connected and usually present many-to-many relationships. With the data normalization, the many-to-many relationship between two nodes has to be represented using a junction table, with two columns referencing the two nodes respectively.

Such organization means that a node's local properties are separated from the graph topology. That is, the edge information has to be stored separately from the node information. As a result, for each traversal from a node to its neighbor(s), the query engine of the database has to perform additional joins to look up the junction table to obtain the topology information associated with the node, which will put negative effects on the cache locality and degrade the system performance.

SUMMARY

It is possible to co-locate adjacency lists and properties of a node in one physical record to obtain cache locality for graph traversals. However, this cannot be implemented in conventional tables through de-normalization because all properties associated with a node would be replicated, which not only causes serious space consumption but also puts each neighbor reference in a separate record. The situation will be worse if a node has multiple adjacency lists, each of which describes a category of neighbors.

In implementations of the subject matter described herein, a middleware layer between the underlying databases and the graphs is presented to enable the databases, such as relational databases, to enable effective and efficient graph processing. In one implementation, an adjacency list for a node may be represented and stored in a special field of a record for that node in a relational table. Either built-in or user-defined data types can be used to represent the adjacency list, depending on the underlying database. In this way, the graph data may be stored as a special form of tables containing both nodes' local properties and graph topology, without additional physical junction tables.

In the query stage, the middleware may translate graph queries into table queries such as Structured Query Language ("SQL") queries over the relevant physical tables. Query semantics over these tables may be fully compatible with SQL and thus provides interoperability. Specifically, as a basic operator, the graph traversal may be done by dynamically retrieving and interpreting the adjacency list for the source node and creating a temporary junction table representing the topology information. A join between the temporary junction table and the sink table can be done efficiently by taking advantageous of the cache locality. In this way, the graph query may be performed efficiently. Moreover, in one implementation, the translated table queries can be further optimized by considering the topology knowledge that is oblivious to the query engine or optimizer of relational database.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "or" is to be read as "and/or" unless the context clearly indicates otherwise. The term "based on" is to be read as "based at least in part on." The term "one implementation" and "an implementation" are to be read as "at least one implementation." The term "another implementation" is to be read as "at least one other implementation." The terms "first," "second," "third" and the like may be used to refer to different or same objects. Other definitions, explicit and implicit, may be included below.

Figure 1:
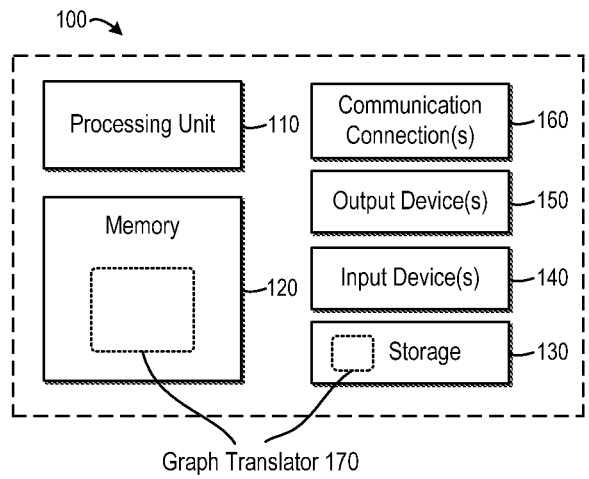
FIG. 1 illustrates a block diagram a computing environment in which one or more implementations of the subject matter described herein can be implemented.

FIG. 1 illustrates an example of a computing environment 100 in which one or more implementations of the subject matter described herein may be implemented. The computing environment 100 is not intended to suggest any limitation as to scope of use or functionality of the subject matter described herein, as various implementations may be implemented in diverse general-purpose or special-purpose computing environments.

With reference to FIG. 1, the computing environment 100 includes at least one processing unit (or processor) 110 and a memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory), or some combination of the two.

The memory 120 stores at least a part of a system or module referred to as "Graph Translator" 170 for enabling the databases (for example, relational database) to support efficient graph processing. In one implementation, Graph Translator 170 may be implemented, for example, as a middleware between the graphs and underlying database tables. This is only illustrative without suggesting any limitation as to scope of the subject matter described herein. For example, in another implementation, Graph Translator 170 can be at least in part implemented as hardware and/or firmware module. In one implementation, Graph Translator 170 may be implemented in the kernel of the underlying database, for example.

The computing environment 100 may have additional components or features. In the example shown in FIG. 1, the computing environment 100 includes storage 130, one or more input devices 140, one or more output devices 150, and one or more communication connections 160. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 130 may be removable or non-removable, and may include computer-readable storage media such as flash drives, magnetic disks, magnetic tapes or cassettes, CD-ROMs, CD-RWs, DVDs, or any other medium which can be used to store information and which can be accessed within the computing environment 100. The storage 130 may store at least a part of instructions for Graph Translator 170.

The input device(s) 140 may be one or more of various different input devices. For example, the input device(s) 140 may include a user device such as a mouse, keyboard, trackball, etc. The input device(s) 140 may implement one or more natural user interface techniques, such as speech recognition, touch and stylus recognition, recognition of gestures in contact with the input device(s) 140 and adjacent to the input device(s) 140, recognition of air gestures, head and eye tracking, voice and speech recognition, sensing user brain activity, and machine intelligence. As other examples, the input device(s) 140 may include a scanning device; a network adapter; a CD/DVD reader; or another device that provides input to the computing environment 100. The output device(s) 150 may be a display, printer, speaker, CD/DVD-writer, network adapter, or another device that provides output from the computing environment 100. The input device(s) 140 and output device(s) 150 may be incorporated in a single system or device, such as a touch screen or a virtual reality system.

The communication connection(s) 160 enables communication over a communication medium to another computing entity. Additionally, functionality of the components of the computing environment 100 may be implemented in a single computing machine or in multiple computing machines that are able to communicate over wired or wireless connections. Thus, the computing environment 100 may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media may include wired or wireless techniques implemented with an electrical, optical, RF, infrared, acoustic, or other carrier.

Implementations of the subject matter can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment 100, computer-readable storage media include memory 120, storage 130, and combinations thereof.

Implementations of the subject matter can be described in the general context of computer-executable instructions, such as those included in program modules, being executed in a computing environment on a target real or virtual processor. Generally, program modules include routines, programs, libraries, objects, classes, components, data structures, or the like that perform particular tasks or implement particular abstract data types. The functionality of the program modules may be combined or split between program modules as desired in various implementations. Computer-executable instructions for program modules may be executed within a local or distributed computing environment. In a distributed computing environment, program modules may be located in both local and remote computer storage media.

Figure 2:
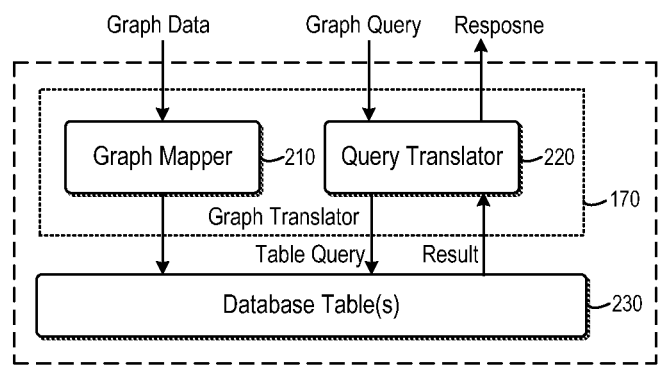
FIG. 2 illustrates a block diagram of a system for database graph processing in one implementation of the subject matter described herein.

FIG. 2 illustrates an example of Graph Translator 170 in one implementation of the subject matter described herein. Graph Translator 170 may be implemented by the computer 100 as described above, for example, on top of any databases either currently known or to be developed in the future. As used herein, a "database" refers to any database that is incapable of directly enabling efficient graph processing, for example, due to the requirement of data normalization. Examples of such databases include, but are not limited to, relational databases such as SQL databases. In the following, some implementations will be discussed in connection with an SQL database. This is only for the purpose of illustration without suggestion of any limitations on the scope of the subject matter described herein. The subject matter described herein may be embodied with any databases that cannot directly support efficient graph data.

With reference to FIG. 2, in general, Graph Translator 170 comprises two modules, namely, a graph mapper 210 and a query translator 220. In one implementation, the graph mapper 210 is configured to receive the request to store graph data and to store the graph data into tables 230 in the underlying database.

In the context of the present disclosure, the term "graph data" refers to the data representing a graph including a plurality of nodes and one or more edges connecting respective nodes. A node may have one or more local properties. Each property may be assigned with a value of the respective data type. Nodes in the graph may be of the same or different types. By way of example, in one application, there may be two types of nodes representative of clients and employees. An employee node may have one or more local properties such as name, age, manager, and the like. Likewise, a client may have local properties. Specifically, in each record in the table 230, a local property can only have a single value in a corresponding field and thus can be referred to as "single-valued property."

In addition to the local or single-valued property, a node may have associations or relationships with one or more other nodes of the same or different type. For example, if one employee and another employee work in the same department in an organization, the nodes representing these two employees may be connected, thereby creating an edge indicating the colleague relationship. As another example, an employee may have a business relationship with one or more clients. Accordingly, the node representing the employee may be connected to the relevant client nodes. It will be appreciated that one node may have multiple edges with other nodes. Therefore, the edge or topology information of the graph can be considered as a multi-valued property of the nodes.

It is to be understood that in some cases, a multi-valued property can be a local property, depending on the configuration of the underlying database. In other words, although an adjacency list that contains the references to adjacent nodes may be implemented as a multi-valued non-local property, a local property that may have multiple possible values can be processed as a multi-valued property as well.

The graph mapper 210 is configured to store the graph data in one or more tables 230 (which can be referred to as "node tables") in the underlying database. In the node table 230, each record corresponds to one of the nodes in the graph. For example, in one implementation, the record may include a field used to store a unique identifier for the corresponding node as the primary key. In one implementation, the identifier may be a numeral. Alternatively or additionally, the identifier may be any reference character, symbol, or combination thereof.

In particular, in implementations of the subject matter described herein, the single-valued and multi-valued properties of a node are stored in a single table. To this end, in one implementation, each record (for example, a row) in the table 230 corresponds to a node in the graph. A record may include one or more single-valued fields, each of which is used to store a single-value property. The record may further have one or more multi-valued fields, each of which is used to store a multi-valued property. In this way, the local node information and topology information are co-located in the node table 230. As a result, it is unnecessary to create a physical junction table(s), which facilitates faster and more efficient graph queries. Functionalities of the graph mapper 210 will be detailed below, for example, with reference to FIG. 3.

The query translator 220 is configured to receive and process graph queries on the graph data. The graph query, among other things, may involve graph traversal operations. Given a source node, a graph traversal operation retrieves and returns data of one or more adjacent nodes in the graph. By way of example, a graph query may include, but is not limited to, pattern matching, iterative graph processing such as finding the shortest path between two nodes and computing PageRank scores of graph nodes, and the like. In one implementation, the query translator 220 may support any suitable graph query language which can be used by the user or user application to express the graph query. In general, the graph query language may be considered as an extended SQL language in order to explicitly express graph patterns over node tables. Examples of the query language will be discussed below.

It would be appreciated that the query engine and/or optimizer of the underlying database may not directly recognize and support the graph query language. In operation, the query translator 220, which has knowledge of the query language, translates the graph queries into table queries (for example, SQL queries) over the relevant table(s) 230. The knowledge of the query language includes, but is not limited to, information about the rules, constraints, grammars and/or syntaxes of the query language. Then the table queries may be executed by the query engine of the database. Moreover, in one implementation, the query translator 230 may utilize the topology knowledge of the graph, which is oblivious to the query engine and/or optimizer of the underlying database, to optimize the translated queries. Functionalities of the query translator 220 will be detailed below, for example, with reference to FIG. 4.

Figure 3:
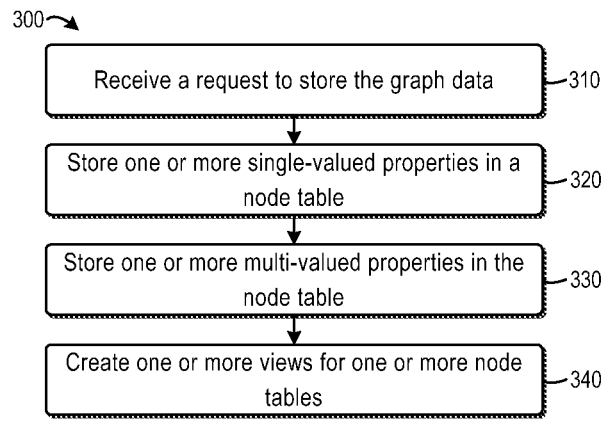
FIG. 3 illustrates a flowchart of a method for storing graph data into database in one implementation of the subject matter described herein.

Reference is now made to FIG. 3 which shows a flowchart of a method 300 for storing graph data into the underlying database such as SQL database. The method 300 may be implemented by the graph mapper 210 in Graph Translator 170 as described above. In particular, for the sake of discussion, the expressions "value of property" and "property" can be used interchangeably in the following description.

As shown, the method 300 is entered at step 310 where a request to store the graph data is received. As described above, the graph includes a plurality of nodes. Each node has at least one single-valued property and at least one multi-valued property. A single-valued property indicates a local property of the node. A multi-valued property may be a non-local property that indicates the topology information related to the node. More specifically, in one implementation, the multi-values property may be used to indicate one or more other nodes in the graph that are adjacent to the current node. As discussed above, one node is adjacent to another if they are directly connected or associated in the graph. Specifically, as described above, a node in the graph may or may not have one or more multi-valued local properties. That is, the multi-valued property is not necessarily a non-local property.

In implementations of the subject matter described herein, the single-valued and multi-valued properties of the nodes are stored into the table node table 230 at steps 320 and 330, respectively. Specifically, at step 320, the value of each single-valued property is stored into a corresponding single-valued field in the node table 230. At step 330, the value of each multi-valued property is stored into the corresponding multi-valued field.

In one implementation, the value of a multi-valued non-local property may be implemented as an adjacency list which contains references to the adjacent nodes. For example, the references may be the identifiers of the adjacent nodes. In one implementation, the identifier of an adjacent node serves as the primary key in the node table for storing that adjacent node. By way of example, assume that an employee with the identifier of "1" is adjacent to employees with the identifiers of "11" and "13." Then the multi-valued property representing the colleague relationship for the employee "1" may be implemented as the adjacency list {11, 13}. The identifiers "11" and "13" are atomic values of the adjacency list. In addition to or instead of the identifiers, the references to the adjacent nodes may be implemented as pointers or the like.

In one implementation, the adjacency list may be formatted to a build-in data type that is supported by the underlying database. For example, in some SQL database, an array type is supported. In this event, the adjacency list of a node can be stored as an array in the multi-valued field. In other cases, however, the multi-valued property cannot be directly supported by the underlying database. At this point, the graph mapper 210 may generate a representation of the plurality of atomic values in the adjacency list, wherein the representation is of a data type that is supported by the database and thus can be stored into the table 230. For example, in one implementation, the graph mapper 210 may generate a string representation of the identifiers in the adjacency list. The identifiers are separated by a predefined delimiter or placeholder in the string, for example. In some implementations, the string representation may be a plain-text string. Alternatively, in some implementations, a binary representation may be used to store the adjacency list.

If the type of adjacent nodes in a multi-valued property is different from the type of adjacent nodes in another multi-valued property, then these two multi-valued properties are of different types. In one implementation, different types of multi-valued properties may be stored in separate multi-valued fields. That is, a record for a node may have more than one multi-valued field. Still considering the example discussed above, for each employee, the corresponding record in node table 230 at least has two multi-valued fields, one for storing the multi-valued property "Colleagues" (employee-employee) while the other for storing the multi-valued property "Clients" (employee-client), where the multi-valued properties "Colleagues" and "Clients" have different types from one another.

Moreover, it would be appreciated that given a node, its adjacent nodes may be stored in the same node table, or in a different node table. For example, for the multi-valued property "Colleagues," the source and sink nodes are both stored in the same table for employee nodes. For the multi-valued property "Clients," the source node is an employee node while the sink nodes are client nodes. In this event, the source node and its adjacent nodes identified by the adjacency list are stored in different node tables. Specifically, it is to be understood that in some cases, some nodes may have no relationship or edge with other nodes. In this event, the value of the multi-valued property can be set as "NULL", for example.

In one implementation, at step 330, the graph mapper 210 may create annotations for one or more multi-valued fields. The annotation may contain information that can be obtained and interpreted by the query translator 220 in processing the graph queries. For example, in one implementation, the graph mapper 210 may receive user input indicating one or more multi-valued properties as non-local properties. Such user input may be included in the graph query. In this implementation, the annotation may be created based on the user input to indicate the usage of the multi-valued field. That is, the annotation specifies that the associated field is a multi-valued field for storing multi-valued non-local property. The annotation may also specify that the associated field is a multi-valued field for storing the multi-valued local property of a node. In one implementation, the usage of a field can be indicated by including pre-defined keyword in the associated annotation. By way of example, it is possible to use the keyword "Edge" or any other suitable keywords in the annotation.

Additionally or alternatively, in one implementation, the annotation may specify the sink node table in which the nodes as indicated in the adjacency list are stored. For example, in the example discussed above, the annotation for the multi-valued field storing the multi-valued property "Colleague" may indicate that the adjacent nodes (employee nodes) are stored in the table for employee nodes, while the annotation for the multi-valued field storing the multi-valued property "Clients" may indicate that the adjacent nodes (client nodes) are stored in the table for client nodes.

The above annotations are described just for the purpose of illustration, without suggesting any limitations as to the scope of the subject matter described herein. In one implementation, the annotation may specify any other suitable information. Moreover, in one implementation, it is also possible to generate annotations for single-valued fields.

It is to be understood that although step 320 is shown to be carried out prior to step 330 in FIG. 3, this is just for the purpose of illustration without suggesting any limitations as to the scope of the subject matter described herein. The single-valued and multi-valued properties can be stored in any suitable order or in parallel. For example, in one implementation, it is possible to use the following SQL statements to create a node table for storing employee nodes, wherein the single-valued and multi-valued properties can be stored into the table at a time.

```
CREATE TABLE EmployeeNode {
    [ColumnRole: NodeID]
    NodeID bigint PRIMARY KEY,
    [ColumnRole: Property]
    Name varchar(32),
    [ColumnRole: Edge, Reference: ClientNode]
    Clients varbinary(max),
    [ColumnRole: Edge, Reference: EmployeeNode]
    Colleagues varbinary(max),
    [ColumnRole: Edge, Reference: EmployeeNode]
    Manager bigint
}
```

In this example, the created table named "EmployeeNode" has five fields. The fields "NodeID" is used to store identifiers of the employee nodes which serve as the primary key. The fields "Name" is a single-valued field used to store the single-valued property which is the name of employee. The fields "Clients," "Colleagues" and "Manager" are multi-valued fields used to store the respective multi-valued properties. As discussed above, values of the multi-valued properties may be implemented as adjacency lists which can be represented by a built-in type (if any) of the underlying database or user-defined representations (for example, binary representations).

In this example, an annotation which is indicated in the brackets is created for each of the fields. For example, the annotation "[ColumnRole: Edge, Reference: ClientNode]" for the multi-valued field "Clients" specifies that the current field is used to store multi-valued property. The annotation further specifies that the nodes in the adjacency list are stored in the table named "ClientNode." In the above example, the keyword "ColumnRole" with values "Edge" or "Property" is used to indicate the role of fields. Any other predefined keywords and/or values are possible as well, as described above. Moreover, in this example, the single-valued field is also associated with an annotation. In an alternative implementation, it is possible to create annotations only for the multi-valued properties. These annotations will be omitted by the database engine, but are stored and processed by the graph mapper 210 as metadata. The annotations can be accessed and interpreted by the query translator 220 in query translation, which will be discussed later.

By way of example, a table that can be created by the above example statements is shown as follows.

| NodeID | Name      | Clients    | Colleagues     | Manager |
|--------|-----------|------------|----------------|---------|
| 1      | John Smith| [11, 13]   | [2, 3, 4, 5, 6]| [1]     |
| 2      | Jane Doe  | [9, 11, 12]| [1, 3, 4, 5]   | [1, 5]  |
| 3      | Bob Allen | [45, 12]   | [1]            | [1]     |
| ...    | ...       | ...        | ...            | ...     |

In one implementation, the method 300 may proceed to step 340, where a view for one or more node tables 230 may be created. Views are useful when applications need a different representation to fit their business logic. For example, in Graph Translator 170, there are usually multiple node tables, each representing a distinct node type. In each node table, there may be multiple multi-valued fields for storing adjacency lists, each representing a distinct type of multi-valued property. Moreover, some applications may only focus on graph topology and overlook such types. For example, the original PageRank algorithm analyzes graph topology and only sees nodes and edges.

To facilitate such applications, in one embedment, a view may be created at step 340 to union all nodes as one node table and union all adjacency lists of a node into one list. That is, in the view, there is a union multi-valued field that contains information about all multi-values properties, for example, in the form of adjacency lists. In this implementation, the user application may perform graph queries over the view. Accordingly, the query translator 220 may translate the graph queries into SQL queries over one or more related relational tables, for example.

Figure 4:
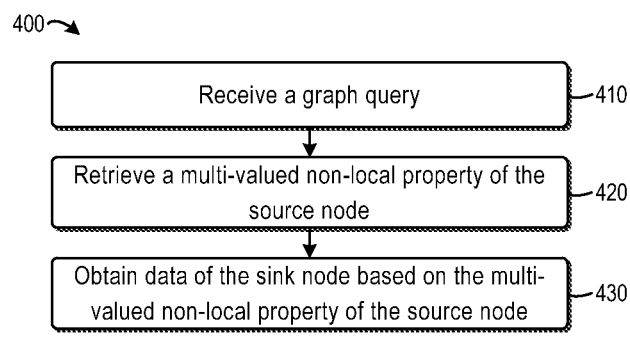
FIG. 4 illustrates a flowchart of a method for graph query in one implementation of the subject matter described herein.

Now the processing of graph queries will be discussed. FIG. 4 shows a flowchart of a method 400 for graph query in one implementation of the subject matter described herein. In one implementation, the method 400 may be implemented by the query translator 230 in Graph Translator 170 as shown in FIG. 2.

The method 400 is entered at step 410, where a graph query on graph data is received. As described above, the graph includes a plurality of nodes, and at least some nodes in the graph may have single-valued properties and multi-valued properties. For each of such nodes, the single-valued and multi-valued properties are stored in different fields in a single node table 230.

The graph query received at step 410 may involve a graph traversal. For example, in one implementation, the graph query itself may be a traversal from a source node to a sink node. The source and sink node are adjacent to one another in the graph. As described above, the source and sink nodes may or may not have the same type. Alternatively, the graph query may be a complicated graph operation including, but not limited to, pattern matching, iterative graph processing, and the like. It would be appreciated by those skilled in the art that the complicated graph operation can be decomposed into a series of graph traversals. Therefore, in the following discussion, the graph traversals will be described for the purpose of illustration. The decomposition and processing of high level graph operations will be discussed below with reference to FIG. 6.

The query translator 220 may allow the user or user application to express graph queries using the graph query language. For example, in one implementation, graph query language may be extended SQL language, such that the user may express graph patterns over node tables explicitly. By way of example, the graph traversals may be expressed as follows:

$$\text{NodeTable}_1\text{-}[E_1]\rightarrow \ldots \text{-}[E_{K\text{-}1}]\rightarrow \text{NodeTable}_K$$

where "NodeTable$_i$" (i=1, . . . k) represent aliases of node tables. The aliases of node tables are connected by named edges, for example, in form of "-[E$_i$]→," where "E$_i$" is a field of the source node table that represents an adjacency list pointing to the sink node table. It is to be understood that the above example is described only for the purpose of illustration without suggesting any limitations as to the scope of the subject matter described herein. Any other suitable graph query language can be developed and used in connection with implementations of the subject matter described herein.

In response to the receipt of the graph query, the query translator 220 translates the graph query into a table query, such as a SQL query composed of one or more SQL statements, to locate the sink node and obtain the data of the sink node. Specifically, at step 420, the query translator 220 may utilize the translated SQL query to access the node table 230 (referred to as "source table") that stores the source node to retrieve a record corresponding to the source node. The retrieved record at least contains a multi-valued field that stores the multi-valued property of the source node. In one implementation, the multi-valued property can be implemented as an adjacency list that contains references to the adjacent nodes, as described above. In particular, the nodes in the adjacency list that is retrieved at step 420 are of the same type as the sink node. In one implementation, the query translator 220 may locate the related multi-valued field based on the associated annotation, as described above.

At step 430, the sink node is located in a sink table(s) that stores data of the sink node, thereby obtaining the data of the sink node. The retrieval is done at least in part based on the multi-valued non-local property, for example, in the form of adjacency list of the source node as retrieved at step 420. In one implementation, a user-defined function (UDF) or a system-provided function can be used to do so. The UDFs will be discussed in the following just for the purpose of illustration. Specifically, the query translator 220 operates to apply a UDF on the multi-valued property as obtained at step 420 to extract the atomic values in the adjacency list.

In one implementation, the UDF may be invoked to create a junction table that associates the source node and its adjacent nodes, based on the retrieved multi-valued property of the source node. By way of example, in one implementation, the UDF named "Transpose" may be defined using following example code snippet:

```
public class BinaryList: IEnumerator {
    public void Reset( ) {...};
    public object Current {...};
    public bool MoveNext( ) {...};
}
[Microsoft.SqlServer.Server.SqlFunction(
TableDefinition = "Sink BIGINT")]
public static IEnumerator Transpose(SqlBinary rawList) {
    return new BinaryList((byte[ ])rawList);
}
```

This code snippet defines the UDF as an enumerator that is invoked repeatedly by the query engine to iterate through a list and insert each element from the list into a one-column table. The table returned by Transpose has a single column, for example, named "Sink".

Figure 5:
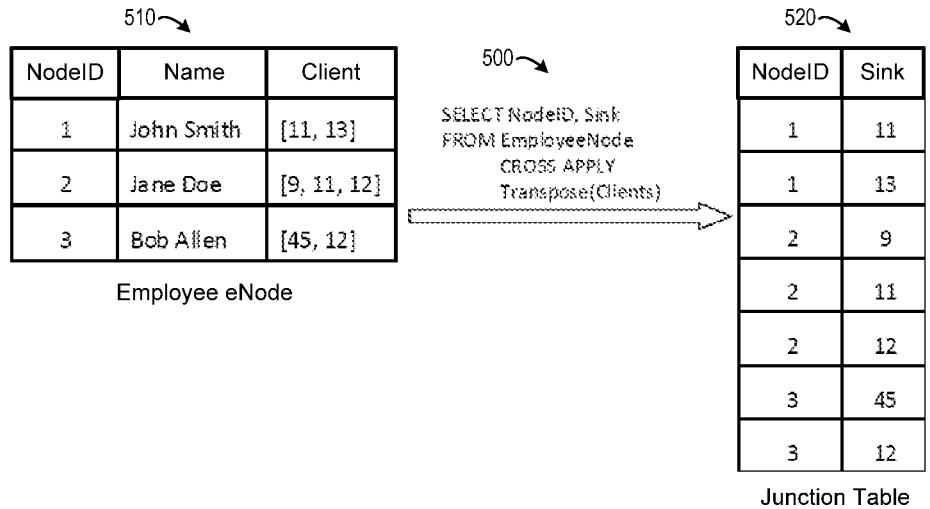
FIG. 5 illustrates a schematic diagram of temporary junction table created by a user-defined function in one implementation of the subject matter described herein.

FIG. 5 illustrates a schematic diagram showing how the UDF works. In this example, the CROSS APPLY operator is used in connection with the UDF to transform all retrieved node records to a two-column table that associates the retrieved nodes and their adjacent nodes. Specifically, in the invocation 500, the CROSS APPLY operator functions as a nested-loop join and invokes the UDF Transpose (Clients) once for every record or row from the outer table EmployeeNode 510. As discussed above, each field in the column "Clients" may store a binary representation of an adjacency list. Each invocation of the UDF by the CROSS APPLY operator will result in a record that associates the source node with one of the adjacent nodes in the adjacency list. The records produced by a plurality of such invocations may be concatenated as the junction table 520.

As shown in FIG. 5, the junction table 520 created by the UDF and CROSS APPLY operator has a column "EmployeeNode" from the source node table and a column "Sink" that contains the primary key of the adjacent nodes in the sink table. In the shown example, only two columns are projected. In other implementations, it is possible to project a plurality of multi-valued fields by the UDF to create the junction table with more columns.

In one implementation, the data of the sink node may be retrieved from the sink table by use of a join between the junction table 520 and the sink table (not shown in the figure) in the translated SQL query. An exemplary complete query traversal from employee nodes to client nodes using the UDF Transpose is shown below:

```
SELECT   cnode.Name
FROM     EmployeeNode AS enode
         CROSS APPLY Transpose(enode.Clients) AS edge
         JOIN ClientNode AS cnode on
         cnode.NodeID = edge.Sink
WHERE    enode.Name = 'Jane Doe'
```

The <NodeID, Sink> pairs returned by the CROSS APPLY operator associate employee nodes with their adjacent nodes. Then by using a join between the sink node table which is named "ClientNode" and the junction table, the records of sink nodes are retrieved.

In the physical execution of the above SQL statements, employee nodes from table EmployeeNode satisfying the condition enode.Name='John Doe' may be retrieved by either a table scan or an index lookup, depending on the decision made by the database query optimizer. Then, the execution of the CROSS APPLY operator is executed. The CROSS APPLY operator invokes the UDF Transpose for every satisfied node/row from the table EmployeeNode. Finally, the join between the sink table ClientNode and Transpose is to use the identifiers of the client nodes from the adjacency list to locate their records.

It would be appreciated that in implementations of the subject matter described herein, a node record usually spans no more than a few disk or memory pages. Moreover, when retrieved from the source table, the node record has loaded it into on-chip cache. As a result, evaluating the UDF usually only consumes processor computations. Such cache locality ensures the high efficiency compared to the conventional physical junction table.

In addition, in those implementations where the graph queries are translated into SQL queries over relational tables, the SQL query optimizer may produce execution efficient plans. For example, the final join in the above translated SQL query that retrieves client nodes can be executed using a hash join or a nested-loop join. The hash join is efficient especially when there are a large number of client nodes to retrieve and the amortized cost of scanning tables and building a hash table is smaller than that of random lookups.

Specifically, in one implementation, the junction table 520 created by the UDF may be a temporary one at query runtime. That is, the junction table 520 is not persisted to the underlying storage. Actually, in one implementation, the junction table 520 may be pipelined in the execution. That is, each record in the junction table 520 can be removed after being used in the join between the junction table 520 and sink table. In this way, the query efficiency can be further improved without storage resource waste.

Implementations of the subject matter described herein are applicable to various types of graph queries. Now the graph pattern matching will be described as an example. A pattern in a graph is a sub-graph that is composed of one or more paths in the graph. A path is a sequence of node tables connected by edges, for example. In operation, the user application may input a pattern and Graph Translator 170 returns one or more patterns in the graph that match the input pattern. To this end, the query translator 220 may decompose the pattern into a series of sub-patterns and then translates each of the sub-patterns into a sequence of CROSS APPLY operator and join, as described above with reference to FIG. 4.

Figure 6:
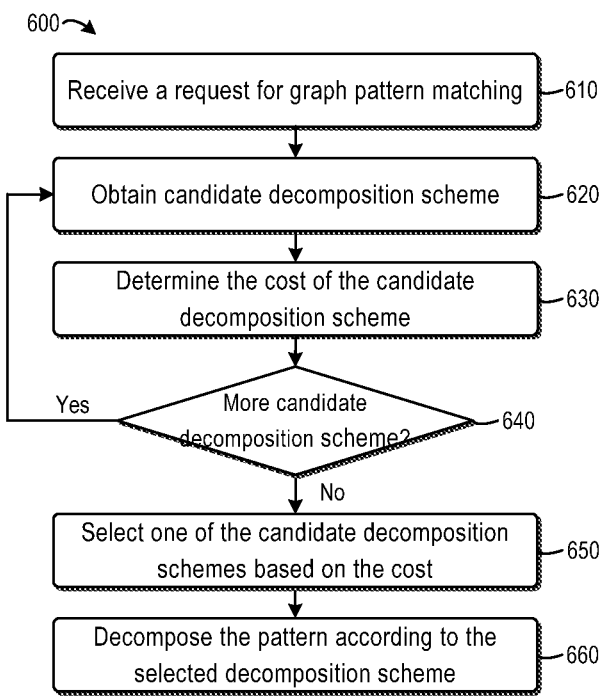
FIG. 6 illustrates a flowchart of a method for decomposing a graph pattern in one implementation of the subject matter described herein.

In one implementation, the match clause may be translated into a sequence of regular table joins in a simple way. For example, the translation can be done by normalizing each multi-valued column storing the adjacency lists into a two-column table, as discussed above. However, such simple translation may not result in optimized SQL queries. In order to take advantage of the cache locality, in one implementation, the query translator 220 searches for optimal decomposition of the pattern in the translation. FIG. 6 illustrates a flowchart of a method 600 for optimal decomposition of the graph pattern in one implementation of the subject matter described herein.

The method 600 is entered at step 610 where a request for graph pattern matching is received. In one implementation, the user may input the pattern matching query using the graph query language supported by the query translator 220. As an example, in one implementation, the graph matching may be expressed as a SELECT-FROM-WHERE query block with an added MATCH clause that specifies a graph pattern. The path may be expressed as -[EdgeName]→, where EdgeName is a column of the source node table that represents an adjacency list pointing to the sink node table. By way of example, an example query on the node table as shown in FIG. 5 is as follows:

```
SELECT   En2.Name, Cn.Name
         FROM EmployeeNode AS En1, EmployeeNode AS En2,
         ClientNode AS Cn JOIN Region AS R
         ON R.RegionID = Cn.RegionID
MATCH    En1-[Colleagues]->En2-[Clients]->Cn,
         En1-[Clients]->Cn
WHERE    En1.Name = 'Jane Doe' AND R.Name = 'NY'
```

In this example, the FROM clause treats node tables and regular tables as usual and assigns to each table an alias. The aliases of node tables are used in the MATCH clause to specify a pattern. In this example, the pattern is a triangle that connects two employee nodes and one client node, which is depicted as the pattern 700 in FIG. 7. It is to be understood that the above example is discussed only for the purpose of illustration, without suggesting any limitations as to the scope of the subject matter described herein. The graph pattern matching can be expressed in other suitable ways.

The method 600 proceeds to step 620, where the specified pattern is decomposed into one or more sub-patterns, thereby obtaining candidate decomposition scheme. In general, the sub-patterns can be selected depending on the requirements and application. In one implementation, it is possible to use one-height trees as basic decomposition sub-patterns to ensure the cache locality. As discussed above, the adjacency lists and local properties of nodes are co-located in node tables. When a node record is loaded into on-chip cache, the identifiers of its adjacent nodes can be reconstructed by the CROSS APPLY operator that mainly involves processor computations. As such, if the one-height trees are selected as basic decomposition sub-patterns, then evaluation of the sub-patterns can be done by a single scan or lookup of the root node table with no other data accesses. That is, by using the one-height trees to cover the entire graph pattern, execution of queries can take advantages of cache locality and avoid unnecessary joins effectively, compared with other decomposition schemes. Of course, it is not necessary to use the one-height trees as the basic decomposition sub-patterns. Any other suitable structure, such as single edges, can be used as the sub-patterns.

Figure 7:
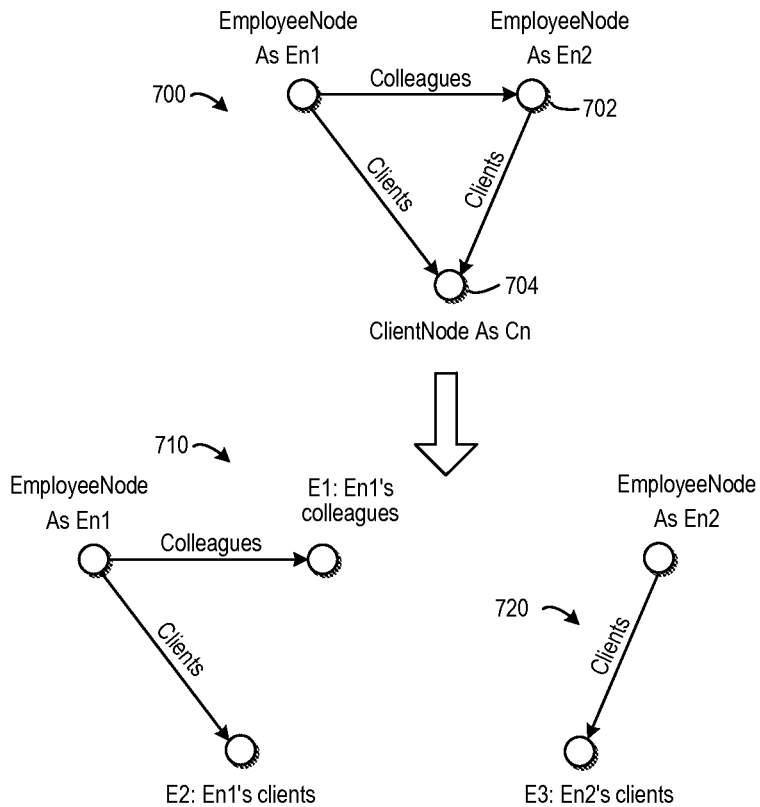
FIG. 7 illustrates a schematic diagram of graph pattern decomposition in one implementation of the subject matter described herein.

As an example, FIG. 7 shows an example of pattern decomposition. The pattern 700 indicated in the above example graph pattern matching is decomposed into two sub-patterns 710 and 720. Each of the sub-patterns 710 and 720 is a one-height tree. The translated SQL query of the decomposed sub-patterns 710 and 720 is as follows:

```
SELECT   *
FROM     (
         EmployeeNode AS En1
         CROSS APPLY Transpose(En1.Colleagues) AS E1
         CROSS APPLY Transpose(En1.Clients) AS E2
         )
         JOIN (
         EmployeeNode AS En2
         CROSS APPLY Transpose(En2.Clients) AS E3
         ) ON E1.Sink = En2.NodeID AND E2.Sink = E3.Sink
```

Still with reference to FIG. 6, the method 600 proceeds to step 630 to determine the cost of the candidate decomposition scheme determined at step 620. In one implementation, the cost includes a sub-pattern cost associated with the individual sub-patterns resulting from the candidate decomposition. In one implementation, the cardinality of a sub-pattern in the graph can be used to measure the individual cost associated with that sub-pattern. The cardinality is defined as the number of results returned by matching the sub-pattern in the graph.

As described above, in one implementation, the sub-patterns may be one-height trees. In this implementation, the number of root instances is the number of rows in the corresponding node table that satisfy the predicates (if any). The number of leaf instances associated with a root instance may be determined by the average degree between the root and leaf. Specifically, if there are multiple leafs in the one-height tree sub-pattern, the leaf instances from different branches will result in Cartesian products in the result table. For the sake discussion, a one-height tree sub-pattern is denoted as $<[l_1, \ldots, l_n]>$, where r represents the root and $l_i$ represents a leaf. The size of the output table of the one-height tree pattern is:

$$|\sigma_{p_i,\ldots,p_m}(R_r)| \times \prod_i d(r \to l_i)$$

where $R_r$ represents the node table of root r, $p_1, \ldots, p_m$ represent the predicates associated with the root r, either conjunctive or disjunctive, and $d(r \to l_i)$ represents the average degree from root r to leaf $l_i$ in the graph.

In one implementation, $[\sigma_{p_1,\ldots,p_m}(R_r)]$ given by the underlying database that estimates the node table size and the selectivity of the predicates. The average degree $d(r \to l_i)$ between two types of nodes is a graph statistic that may be maintained by Graph Translator 170. It can be computed over the graph once and periodically re-computed, for example, responsive to the dramatic change of data distributions.

In addition to the sub-pattern cost, the cost to be determined at step 630 may include connection cost associated with the connection of two or more sub-patterns. For ease of discussion, the connection of two sub-patterns will be described, where the one-height trees function as the sub-patterns. Two sub-patterns can be connected by two types of joins, as illustrated in FIG. 8.

Figure 8:
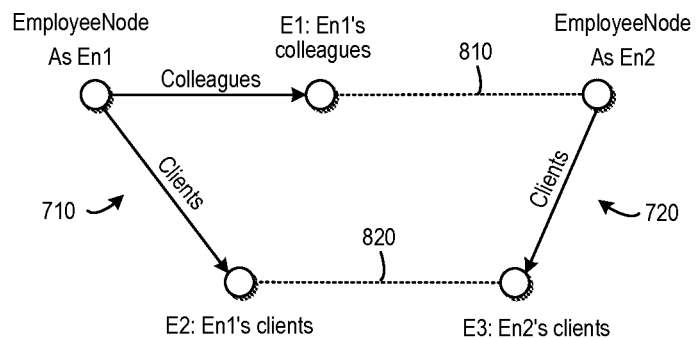
FIG. 8 illustrates a schematic diagram of connections of sub-patterns in one implementation of the subject matter described herein.

The first type of joins, shown as 810 in FIG. 8, connects a leaf of the sub-pattern 710 to the root of another sub-pattern 720. Physically, it is a join between a column storing the multi-valued property (adjacent lists) of one node table and a column storing the primary key of another node table. The cardinality of the sub-pattern 710 may be already known, as described above. The result size after the join is determined by (1) how many elements in the adjacency list survive the join, and (2) starting from these survived nodes, how many new nodes can be reached following the branches of the sub-pattern 720.

Assume that every element in each adjacency list points to a valid node of the target type. Then nodes from the adjacency list can only be eliminated if they do not satisfy the predicates on the root of the sub-pattern 720. The elimination rate is given by the selectivities of the predicates, which can be obtained through the query optimizer of the underlying database. Additionally, the number of new accessible nodes is determined by the average degrees of the branches of the sub-pattern 720. These parameters are graph statistics and may be collected by Graph Translator 170.

The result cardinality of a first-type join may be formally described as follows. Let $\{r^1, [l_1^1, \ldots, l_m^1]\}$ be two one-height tree sub-patterns that are joined on $l_k^1$ and $r^2$. The connection cost may be measured as:

$$\left|\sigma_{p_1^1,\ldots,p_m^1}(R_{r^2})\right| \times \Pi_{i \neq k} d(r^1 - l_i^1) \times d(r^1 - l_k^1) \times$$

$$\frac{\left|\sigma_{p_1^2,\ldots,p_m^2}(R_{r^2})\right|}{[R_{r^2}]} \times \Pi_j d(r^2 - l_j^2)$$

The second type of joins connects two leaves from two sub-patterns, as shown by the connection 820 in FIG. 8. It can be considered as an intersection of two adjacency lists. Estimating the cardinality of an intersection requires the data distributions of the two lists. Such knowledge, however, is not immediately available in the underlying database, for example, if the adjacency lists are encoded in a binary format. In one implementation, the information can be explicitly maintained by Graph Translator 170.

To this end, sampling may be used to build a histogram of an adjacency-list column of a node table. More specifically, it is possible to sample small portion of nodes from a node table and transpose their target adjacency lists into a two-column table (for example, the table 520 in FIG. 5), a tabular representation of the relationship between the edge's source and sink nodes. Then the query optimizer of the underlying database may be leveraged to calculate the cardinality of the second-type joins as the connection cost.

Returning to FIG. 6, at step 640, the query translator 220 checks whether all the possible candidate decomposition schemes have been considered. It would be appreciated that in practice, there are usually multiple ways to decompose a graph pattern into sub-patterns. The method 600 enumerates various decomposition schemes, for example, by a searching algorithm in order to select an optimal decomposition scheme such that the corresponding table query can be executed by the query engine efficiently.

Specifically, in one implementation, the topology knowledge of the graph may be used in determining how many candidate decomposition schemes are available at step 640. As described above, the graph pattern in the MATCH clause may be defined by one or more paths in the graph. This is similar to a table join graph in SQL. However, unlike a table join graph that can be decomposed by the database query optimizer into various sub-expressions when searching an optimal execution plan, translated CROSS APPLY sequences cannot be changed by the database optimizer, because the semantics of the graph is oblivious to the query engine.

The topology knowledge of the graph may be used to optimize the table queries. By way of example, such knowledge includes reversed edges. As known, graph nodes are usually highly connected. In some instances, it is common that two nodes point to each other through directed edges. In such a case, a traversal from a source node to a sink node is equivalent to the one through the backward edge from the sink node to source node, when we need to retrieve both nodes. By way of example, a graph traversal NodeTable$_1$-[Edge$_1$]→NodeTable$_2$ may be translated by the query translator 220 into the following SQL query statements:

NodeTable1 AS $N_1$

CROSS APPLY Transpose ($N_1$·Edge$_1$) AS $E_1$

JOIN NodeTable$_2$ AS $N_2$ ON $E_1$·Sink=$N_2$·NodeID

Assume that the table NodeTable$_2$ contains a multi-valued field Edge$_2$ that points back to nodes in the table NodeTable$_1$. Then the traversal graph NodeTable$_2$-[Edge$_2$]→NodeTable$_1$ can be translated in to the following SQL query:

NodeTable$_2$ AS $N_2$

CROSS APPLY Transpose ($N_2$·Edge$_2$) AS $E_2$

JOIN NodeTable1 AS $N_1$ ON $E_2$·Sink=$N_1$·NodeID

It would be appreciated that the above two SQL queries are semantically equivalent to one another. The query optimizer of the underlying database (for example, the SQL database), however, is unaware of such an equivalence and unable to rewrite the query from one form to the other during the phase of SQL query optimization, thereby limiting the space of candidate execution plans.

Graph Translator 170 (more especially the query translator 220) may take such equivalence into consideration when translating to table queries. In particular, at least one of the decomposition schemes can be obtained based on a reversed edge for an edge in the pattern. For the sake of discussion, reference is made to the example shown in FIG. 7. If it is determined that the traversal from the node 702 to node 704 is semantically equivalent to the traversal from the node 704 to node 702, then more candidate decomposition schemes can be made available by reversing the directed edge from the node 702 to 704. In this way, it is possible to obtain better decomposition schemes such that the resulting query over the relational tables can be processed by the query engine efficiently.

Still with reference to FIG. 6, if it is determined at step 640 that there are any remaining candidate decomposition schemes that have not been considered yet, the method 600 returns to step 620 to obtain one of them and calculates the associated cost at step 630. On the other hand, if all the possible candidate decomposition schemes have been considered, then the method 600 proceeds to step 650, where one of the candidate decomposition schemes is selected based on the cost. For example, in one implementation, it is possible to select candidate decomposition scheme with cost that is low enough (for example, below a threshold). Specifically, in one implementation, the candidate decomposition scheme that minimizes the cost may be selected at step 650. Then at step 660, the pattern is decomposed according to the decomposition scheme selected at step 650, thereby obtaining a collection of sub-patterns.

In addition to or instead of the pattern decomposition, the topology knowledge can be used to facilitate the optimization of other graph queries. For example, in addition to the graph pattern matching which is a building block of graph processing, another type of common graph processing is iterative graph processing. Iterative graph processing is a graph computation model that assigns to each node a state and continuously updates it using the states of the node's neighbors. The computation terminates either after a fixed number of iterations or some parameters have converged. Examples of the iterative graph processing include, but are not limited to, the shortest path, page rank, and the like.

By way of example, the shortest path algorithm aims to find a shortest path between two nodes. In one implementation, the query translator 220 may use two tables to optimize the shortest path query. In particular, the query translator 220 may maintain a table named FromSource (sink, dist) for paths starting from the node @start, and a table named ToSink(source, dist) for paths ending at the node @end. In each round of iteration, paths from one of them are expanded. The selection of table in the iteration depends on a parameter such as the table size. Of course, in another implementation, more sophisticated parameters, such as neighborhood statistics, can be used for the decision.

The query translator 220 may operate to choose a traversal direction that discovers fewer paths. Once a direction is chosen, the expansion query, namely, the join between FromSource (or ToSink) and AllNodes may be coupled with the MIN aggregation to accommodate the pre-aggregation optimization. At the end of a round of the iteration, FromSource and ToSink are joined. The iteration terminates as soon as this join produces some result(s). In this way, instead of populating all paths, the execution only populates paths starting from @start or ending at @end.

Moreover, similar to the pattern decomposition as described above, finding a shortest path can trace either forward from @start or backward from @end. By virtue of the tables FromSource(sink, dist) and ToSink(source, dist), it is possible to select a direction that leads to sparser regions, so that the execution can access fewer nodes. From a query processing perspective, it is equivalent to choosing a join order that leads to less join selectivity.

Figure 9:
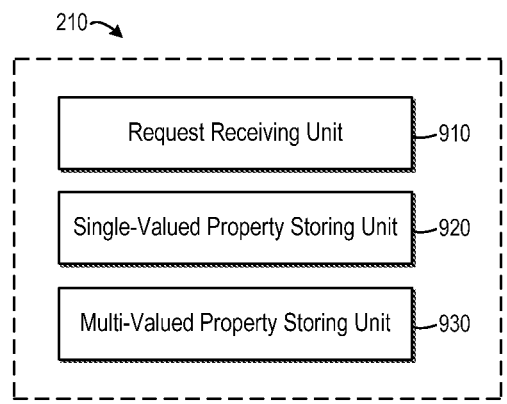
FIG. 9 illustrates a block diagram of the graph mapper in one implementation of the subject matter described herein.

FIG. 9 illustrates a block diagram of the graph mapper 210 in one implementation of the subject matter described herein. As shown, in one implementation, the graph mapper 210 comprises a request receiving unit 910 configured to receive a request to store data representing a graph including a plurality of nodes, at least one of the nodes having a single-valued property and a multi-valued property. The multi-valued property may be a non-local property and include a reference to at least one adjacent node.

The data is stored into a table in a database, where each of the records in the table correspond to one of the nodes. To this end, the graph mapper 210 may comprise a single-valued property storing unit 920 configured to store the single-valued property in a single-valued field, and a multi-valued property storing unit 930 configured to store the multi-valued property in a multi-valued field. In one implementation, the multi-valued property storing unit 930 is configured to store different types of multi-valued properties in different multi-valued fields.

In one implementation, the graph mapper 210 comprises an annotation generating unit configured to generate an annotation for the multi-valued field, the annotation indicating that the multi-valued field is used to store the multi-valued property. The annotation may be created based on the user input indicating that one or more multi-valued properties are non-local properties. The user input may be included in the graph query, for example. In one implementation, the annotation further indicates a sink table that stores the at least one adjacent node.

In one implementation, the multi-valued property includes a plurality of atomic values. The graph mapper 210 may comprise a representation generating unit configured to generate a representation of the plurality of atomic values in a data type that is supported by the database. In this implementation, the multi-valued property storing unit 930 is configured to store the generated representation in the multi-valued field.

In one implementation, the multi-valued property storing unit 930 is configured to store different types of multi-valued properties in different multi-valued fields.

In one implementation, the graph mapper 210 comprises a view generating unit configured to generate at least one view for the graph, the view including a union multi-valued field containing the first and second multi-valued properties.

Figure 10:
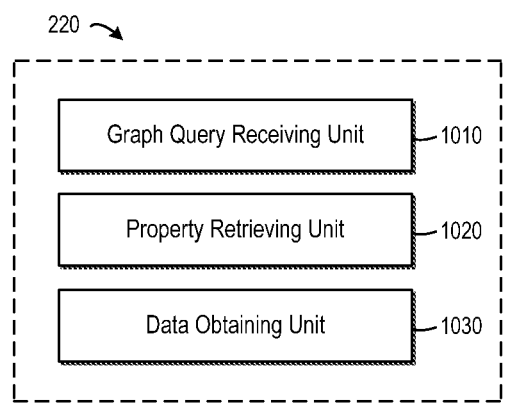
FIG. 10 illustrates a block diagram of the query translator in one implementation of the subject matter described herein.

FIG. 10 illustrates a block diagram of the query translator 220 in one implementation of the subject matter described herein. The query translator 220 comprises a graph query receiving unit 1010 configured to receive a graph query on data representing a graph including a plurality of nodes, the graph query involving a traversal from a source node to a sink node that is adjacent to the source node; a property retrieving unit 1020 configured to retrieve, from a source table in a relational database, a record corresponding to the source node, the record containing a multi-valued field that stores a multi-valued non-local property of the source node, the multi-valued non-local property including a reference to at least one adjacent node of the source node; and a data obtaining unit 1030 configured to obtain, based on the multi-valued non-local property of the source node, data of the sink node from a sink table.

In one implementation, the data obtaining unit 1030 comprises a junction table creating unit configured to create a junction table that associates the source node and the reference to the at least one adjacent node. In this implementation, the table query with a join between the junction table and the sink table may be generated. In one implementation, the data obtaining unit 1030 is configured to recognize, from an annotation for the multi-valued field, that the multi-valued field is used to store the multi-valued non-local property, and to create the junction table by invoking a predefined function such as a UDF or a system-defined function on the multi-valued non-local property of the source node. Additionally or alternatively, in one implementation, the data obtaining unit 1030 is configured to pipeline the junction table by removing a record in the junction table after the record is used in the join between the junction table and the sink table. Of course, a persistent junction table is possible as well.

Specifically, in one implementation, the graph query is translated into a table query over the source table and the sink table. Then the translated table query performs the retrieving of the multi-valued non-local property of the source node and the obtaining of the data of the sink node.

In one implementation, the graph query involves a pattern to be matched in the graph. The query translator 220 may comprise: a candidate obtaining unit configured to obtain a plurality of candidate decomposition schemes of the pattern, each of the candidate decomposition schemes resulting in a plurality of sub-patterns; a cost determining unit configured to determine cost for each of the candidate decomposition schemes, the cost including sub-pattern cost associated with the sub-patterns resulted from the candidate decomposition scheme and connection cost associated with a connection of the sub-patterns; a decomposition scheme selecting unit configured to select one of the candidate decomposition schemes with the cost below a predefined threshold (for example, the candidate decomposition scheme with the lowest cost); and a decomposing unit configured to decompose the pattern according to the selected candidate decomposition scheme.

In one implementation, the cost determining unit is configured to determine the sub-pattern cost associated with a sub-pattern by determining a cardinality of the sub-pattern in the graph. In one implementation, the candidate obtaining unit is configured to obtain at least one of the candidate decomposition schemes based on a reversed edge for an edge in the pattern.

In one implementation, the graph query involves iterative processing on the graph. The query translator 220 may comprise: a topology knowledge obtaining unit configured to obtain topology knowledge on the graph, the topology knowledge being unavailable to the database; and a query optimizing unit configured to optimize the iterative processing at least in part based on the topology knowledge.

The functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Various implementations of the subject matter described herein may be implemented in hardware or special purpose circuits, software, logic or any combination thereof. Some aspects may be implemented in hardware, while other aspects may be implemented in firmware or software which may be executed by a controller, microprocessor or other computing device. While various aspects of implementations of the subject matter described herein are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, implementations of the subject matter can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various implementations. Machine-executable instructions for program modules may be executed within a local or distributed device. In a distributed device, program modules may be located in both local and remote storage media.

Program code for carrying out methods of the subject matter described herein may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of this disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Conversely, various features that are described in the context of a single implementation may also be implemented in multiple implementations separately or in any suitable sub-combination Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

I claim:

1. A computer-implemented system comprising:
   a graph mapper configured to store data representing a graph into a first table in a relational database, each node in the graph having a single-valued property and a multi-valued property, the multi-valued property being a non-local property and containing a reference to at least one adjacent node, the mapper configured to store each node in a corresponding record in the first table by:
      storing the single-valued property in a single-valued field, and
      storing the multi-valued property in a multi-valued field;
   a query translator configured to:
      receive a graph query on the graph, the query including a traversal from a first node to a second node that is adjacent to the first node,
      convert the graph query into a structured query language (SQL) query over the first table and a second table, and
      retrieve the multi-valued property of the first node from the first table and obtain data of the second node from the second table with the SQL query; and
   the graph mapper further configured to:
      store, for each node in the graph, an adjacency list in the multi-valued field, the adjacency list containing the reference to the at least one adjacent node,
      transform the adjacency list to a temporary table; and
      use the temporary table to locate the corresponding record.

2. The system of claim 1, wherein the query translator is configured to generate the SQL query that invokes a predefined function on the multi-valued property of the first node to create the temporary table, the temporary table being a temporary junction table associating the first node and the at least one adjacent node.

3. The system of claim 2, wherein the query translator is configured to generate the SQL query that includes a join between the temporary junction table and the second table.

4. The system of claim 1, wherein the graph query includes a pattern to be matched in the graph, and wherein the query translator is configured to:
   obtain a plurality of candidate schemes for decomposition of the pattern, each of the candidate schemes resulting in a plurality of sub-patterns;
   determine cost for each of the candidate schemes, the cost including sub-pattern cost associated with the individual sub-patterns resulted from the candidate scheme and connection cost associated with a connection of the sub-patterns; and
   decompose the pattern according to one of the candidate schemes with the minimized cost.

5. The system of claim 1, wherein the adjacency list is a first adjacency list and the multi-valued field is a first multi-valued field, wherein each node in the graph further has a second adjacency list of a different type from the first adjacency list, and wherein the graph mapper is further configured to:
   store, for each node in the graph, the second adjacency list in a second multi-valued field in the corresponding record, the second multi-valued field being separate from the first multi-valued field.

6. A computer-implemented method comprising:
   receiving a request to store data representing a graph including a plurality of nodes, at least one of the nodes having a single-valued property and a multi-valued property, the multi-valued property being a non-local property and including a reference to at least one adjacent node;
   storing the data in a table in a relational database, each of records in the table corresponding to one of the nodes, the storing comprising storing the at least one of the nodes in the corresponding record by:
      storing the single-valued property in a single-valued field, and
      storing the multi-valued property in a multi-valued field;
   receiving a graph query on the graph, the query including a traversal from a first node to a second node that is adjacent to the first node;
   converting the graph query into a structured query language (SQL) query over the first table and a second table;
   retrieving the multi-valued property of the first node from the first table and obtain data of the second node from the second table with the SQL query;
   storing, for each node in the graph, an adjacency list in the multi-valued field, the adjacency list containing the reference to the at least one adjacent node;
   transforming the adjacency list to a temporary table; and
   using the temporary table to locate the corresponding record.

7. The method of claim 6, further comprising:
   receiving a user input indicating that the multi-valued property is a non-local property; and
   generating, based on the user input, an annotation for the multi-valued field, the annotation indicating that the multi-valued field is used to store the multi-valued property.

8. The method of claim 7, wherein the annotation further indicates a sink table that stores the at least one adjacent node.

9. The method of claim 6, wherein the multi-valued property includes a plurality of atomic values, and wherein storing the multi-valued property comprises:
   generating a representation of the plurality of atomic values with a data type that is supported by the relational database; and
   storing the generated representation in the multi-valued field.

10. The method of claim 6, wherein the multi-valued property is a first multi-valued property and the multi-valued field is a first multi-valued field, wherein the at least one of the nodes further has a second multi-valued property of a different type from the first multi-valued property, and wherein storing the data further comprises:
    storing the second multi-valued property in a second multi-valued field in the corresponding record, the second multi-valued field being separate from the first multi-valued field.

11. The method of claim 10, further comprising:
    generating a view for the graph, the view including a union multi-valued field containing the first and second multi-valued properties.

12. A computer-implemented method comprising:
    receiving a graph query on data representing a graph including a plurality of nodes, the graph query involving a traversal from a source node to a sink node that is adjacent to the source node;
    converting the graph query into a structured query language (SQL) query over the first table and a second table;
    retrieving, from a source table in a relational database, a record corresponding to the source node, the record containing a multi-valued field that stores a multi-valued non-local property of the source node, the multi-valued non-local property including a reference to at least one adjacent node of the source node;
    obtaining, based on the multi-valued non-local property of the source node, data of the sink node from a sink table with the SQL query;
    storing, for each node in the graph, an adjacency list in the multi-valued field, the adjacency list containing the reference to the at least one adjacent node;
    transforming the adjacency list to a temporary table; and
    using the temporary table to locate the corresponding record.

13. The method of claim 12, wherein the temporary table is a junction table and obtaining the data of the sink node comprises:
    creating the junction table that associates the source node and the reference to the at least one adjacent node; and
    obtaining the data of the sink node with a join between the junction table and the sink table.

14. The method of claim 13, wherein creating the junction table comprises:
    recognizing, from an annotation for the multi-valued field, that the multi-valued field is used to store the multi-valued non-local property; and
    creating the junction table by invoking a predefined function on the multi-valued non-local property of the source node.

15. The method of claim 13, further comprising:
    responsive to the graph query being received, translating the graph query into a table query over the source table and the sink table for the retrieving and the obtaining.

16. The method of claim 12, wherein the graph query includes a pattern to be matched in the graph, the method further comprising:

obtaining a plurality of candidate schemes for decomposition of the pattern, each of the candidate schemes resulting in a plurality of sub-patterns of the pattern;

determining cost for each of the candidate schemes, the cost including sub-pattern cost associated with the individual sub-patterns resulted from the candidate scheme and connection cost associated with a connection of the sub-patterns;

selecting one of the candidate schemes with the cost below a predefined threshold; and decomposing the pattern according to the selected candidate scheme.

17. The method of claim 16, wherein determining the cost comprises:

determining the sub-pattern cost associated with a sub-pattern by calculating a cardinality of the sub-pattern in the graph.

18. The method of claim 16, wherein obtaining the plurality of candidate schemes comprises:

obtaining at least one of the candidate schemes based on a reversed edge for an edge in the pattern.

19. The method of claim 12, wherein the graph query involves iterative processing on the graph, the method further comprising:

obtaining topology knowledge on the graph, the topology knowledge being isolated from the relational database; and optimizing the iterative processing at least in part based on the topology knowledge.

* * * * *